Oct. 20, 1964  A. P. ROGERS  3,153,538
PIN HANDLING APPARATUS FOR SELECTIVELY SETTING LESS
THAN TEN PINS FOR PRACTICE BOWLING
Filed March 17, 1961  11 Sheets-Sheet 3

Oct. 20, 1964  A. P. ROGERS  3,153,538
PIN HANDLING APPARATUS FOR SELECTIVELY SETTING LESS
THAN TEN PINS FOR PRACTICE BOWLING
Filed March 17, 1961  11 Sheets-Sheet 4

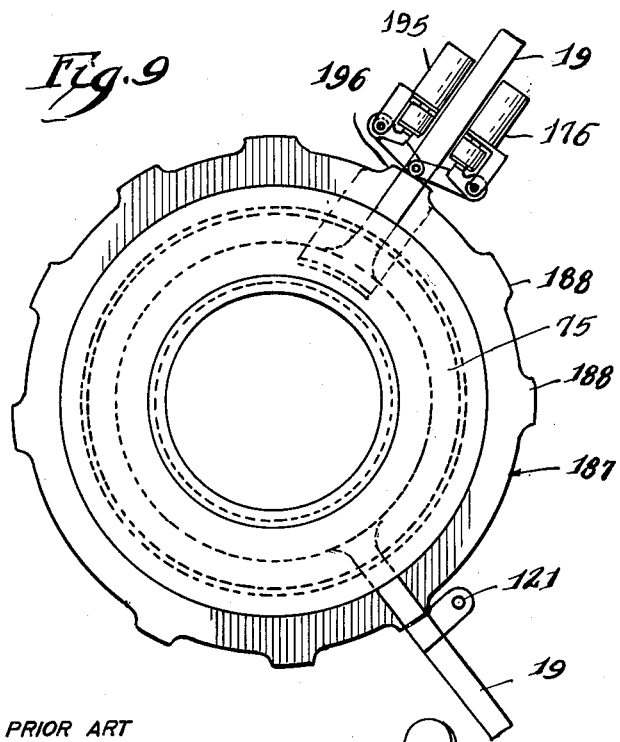
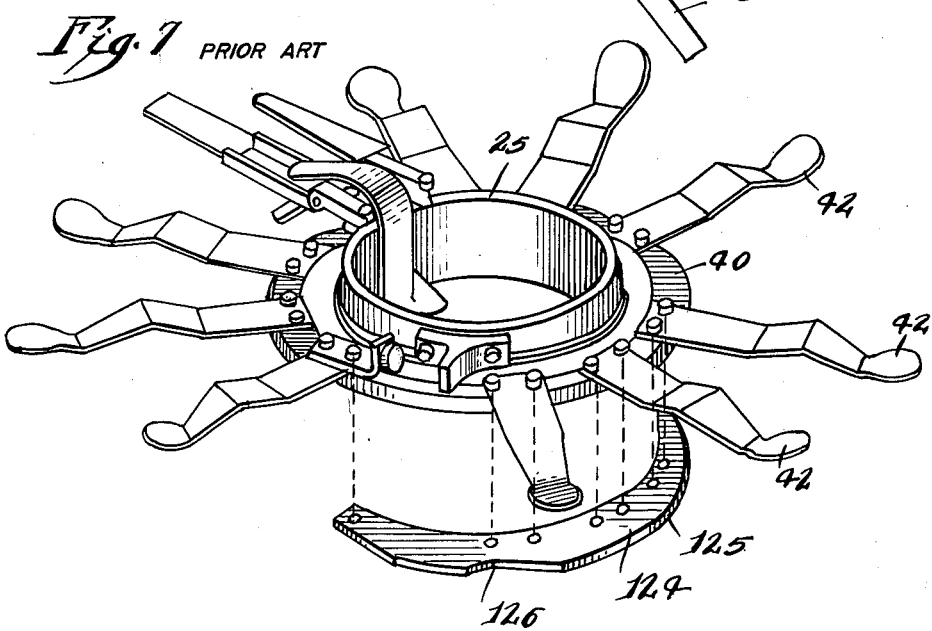

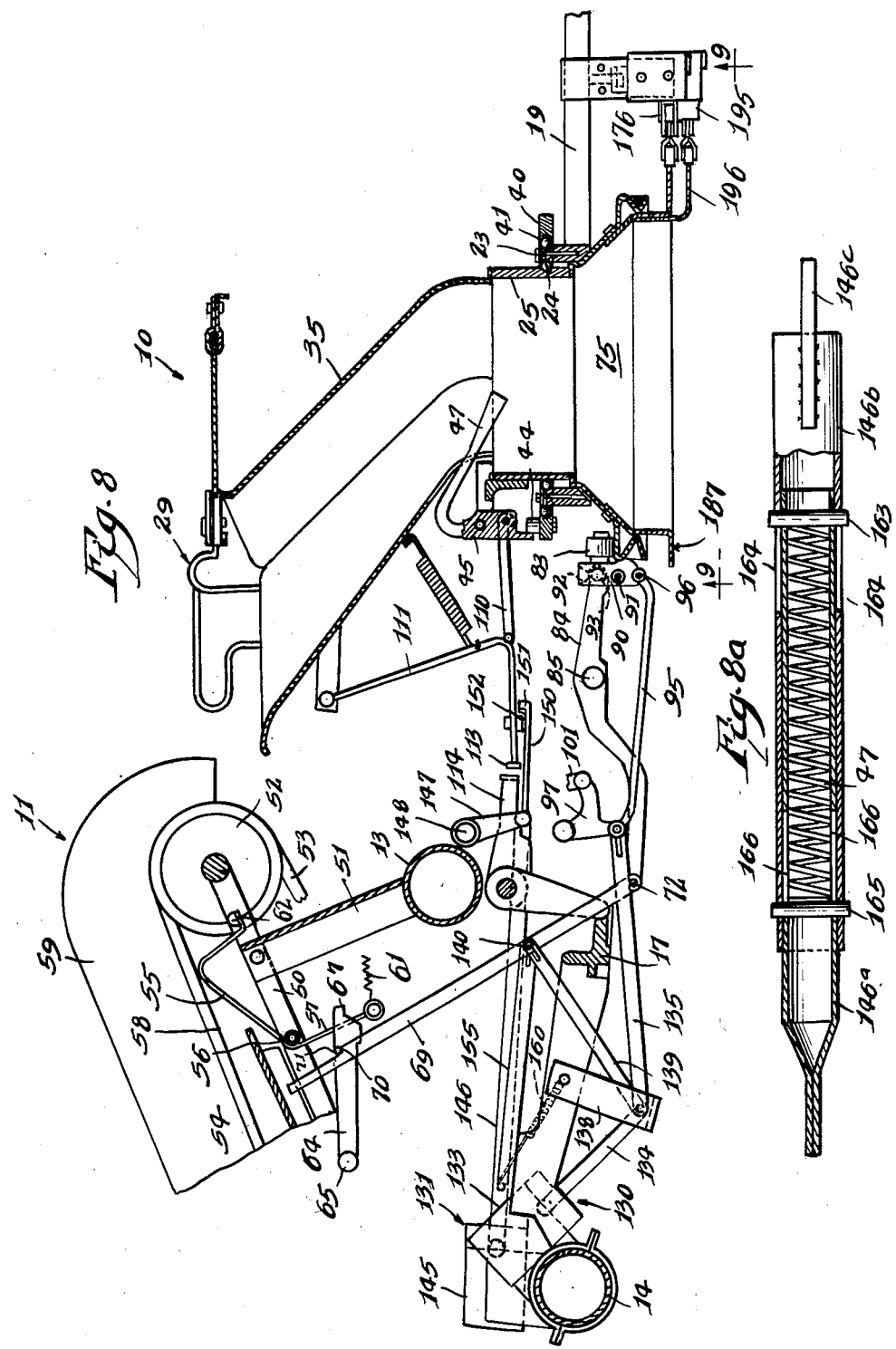

Oct. 20, 1964 A. P. ROGERS 3,153,538
PIN HANDLING APPARATUS FOR SELECTIVELY SETTING LESS
THAN TEN PINS FOR PRACTICE BOWLING
Filed March 17, 1961 11 Sheets-Sheet 7

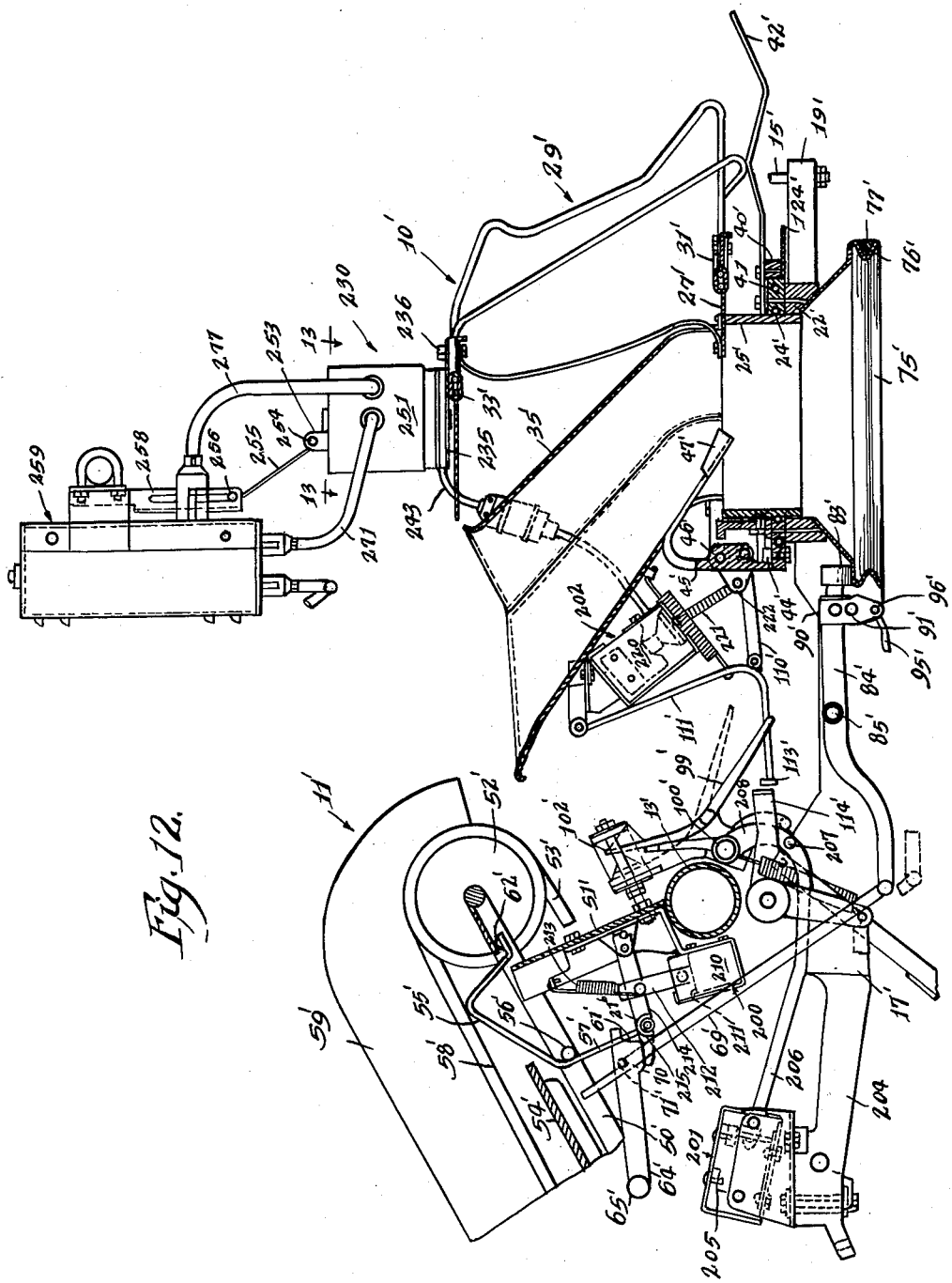

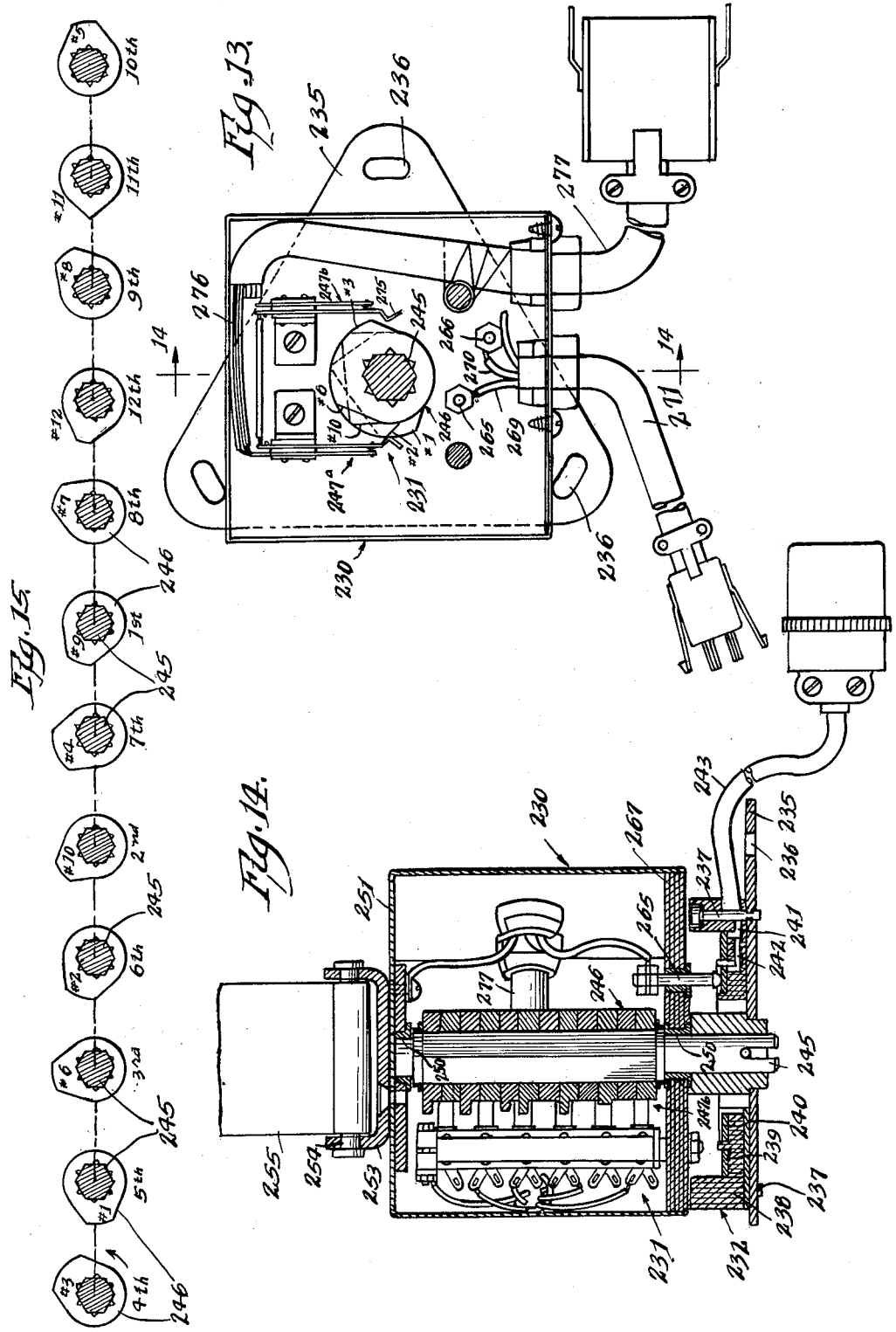

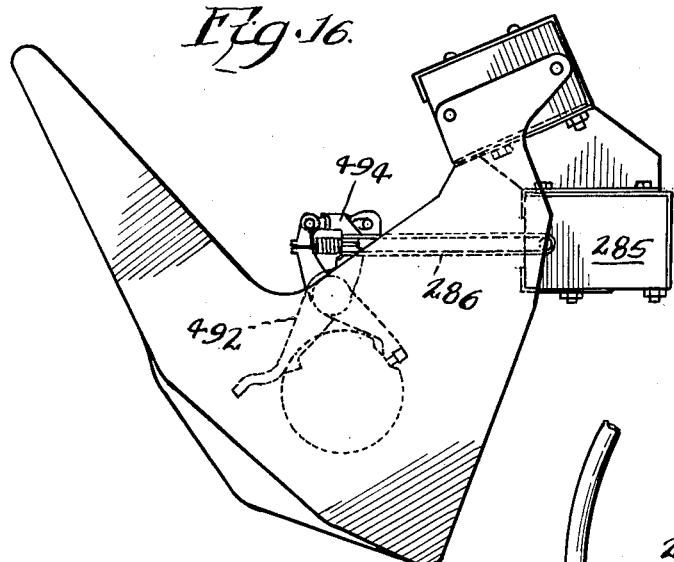
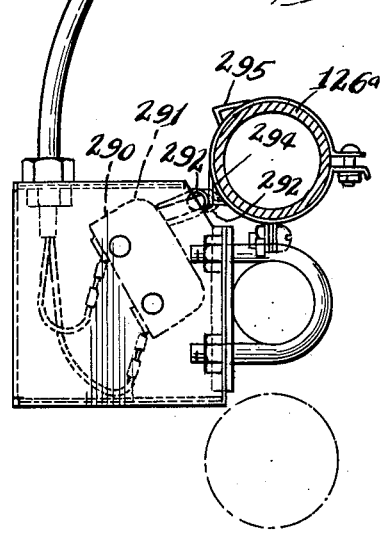
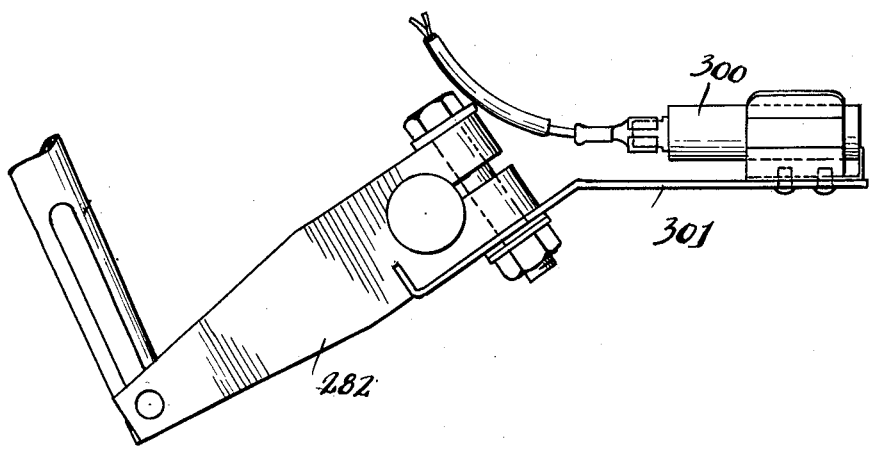

United States Patent Office 3,153,538
Patented Oct. 20, 1964

3,153,538
PIN HANDLING APPARATUS FOR SELECTIVELY SETTING LESS THAN TEN PINS FOR PRACTICE BOWLING
Albert P. Rogers, Spring Lake, Mich., assignor, by mesne assignments, to Brunswick Corporation, Chicago, Ill., a corporation of Delaware
Filed Mar. 17, 1961, Ser. No. 97,125
19 Claims. (Cl. 273—43)

This application is a continuation-in-part of my co-pending application Serial No. 43,597, filed July 18, 1960, and now abandoned.

This invention relates to bowling pin handling apparatus, and particularly to a pin handling mechanism for use in an automatic pinsetter to enable the selective setting of less than the normal complement of ten pins for practice bowling, for example.

It is a general object of the invention to provide a new and improved pin handling apparatus of the type described.

Another object is to provide a new and improved pin handling apparatus of the type described, including an indexable pin receiving turret for delivering pins to a pin setting deck structure, conveyor means having a discharge end disposed to deliver pins successively to pin receiving pockets in the turret, means for operating the conveyor and the turret in timed relationship to fill the turret pockets, and selectively operable means for controlling the turret and the conveyor means to fill only preselected pockets in the turret less than the total number of turret pockets.

A more specific object is to provide a new and improved apparatus of the type described, including manually selectively operable control switch means corresponding respectively to pin receiving pockets in the turret, for controlling operation of the conveyor means and turret to preselectively prevent delivery of pins to preselected turret pockets.

Other objects and advantages will become readily apparent from the following detailed description taken in connection with the accompanying drawings, in which:

FIG. 7 is a fragmentary perspective view, partly exploded, taken from the right front of FIGS. 1 and 2, illustrating portions of the turret control mechanism for conventional cycling;

FIG. 8 is a vertical sectional view, similar to FIG. 2, illustrating portions of the turret and conveyor actuating mechanisms to which the control of the present invention is applied;

FIG. 8a is a fragmentary sectional view illustrating a link construction;

FIG. 9 is a fragmentary plan view taken at about the line 9—9 of FIG. 8, illustrating a switch actuating cam mechanism embodied in the control of the present invention;

FIG. 10 is a wiring diagram illustrating the control of the present invention; and FIG. 11 is a plan view of a control panel embodied in the control of the present invention.

FIGS. 1–7 show a conventional turret and conveyor mechanism to clearly illustrate the apparatus to which the control of the present invention is applied.

FIGS. 8–11 illustrate the application of a control according to the present invention.

FIGS. 12 to 20 illustrate another embodiment of a control including the principles of the present invention.

FIG. 12 is a sectional view, similar to FIG. 8, illustrating the modified control;

FIG. 13 is an enlarged fragmentary horizontal view, taken at about the line 13—13 of FIG. 12;

FIG. 14 is a vertical sectional view taken at about the line 14—14 of FIG. 13;

Figure 20:
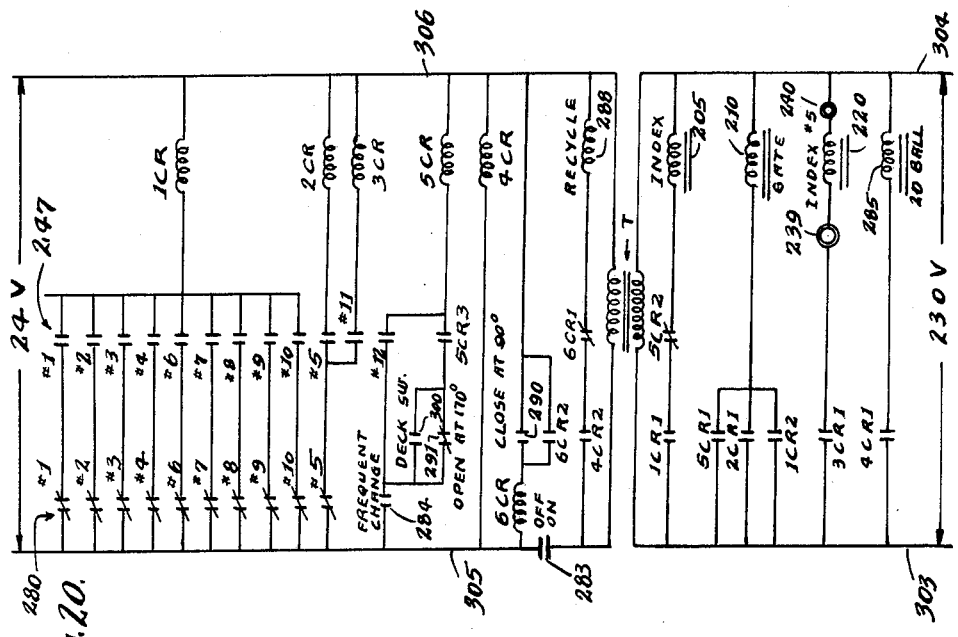
Figure 19:
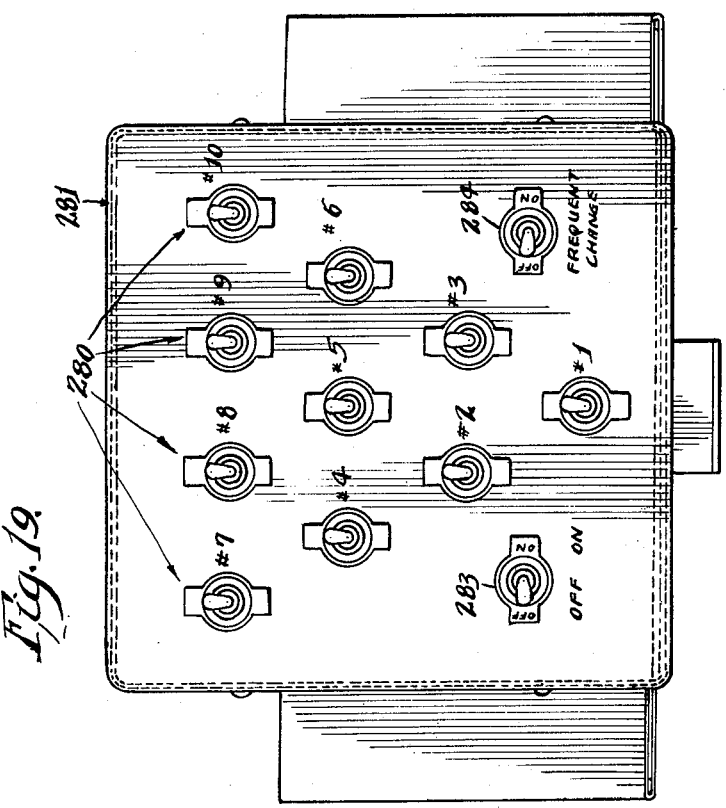

FIG. 15 comprises a series of fragmentary sectional views on planes parallel to the line 13—13 of FIG. 12 illustrating switch actuating cams in the control switch means of FIGS. 13 and 14;

FIG. 16 is a fragmentary elevational view of a pinsetter control mechanism including a solenoid means in the circuit of the present control;

FIG. 17 is a fragmentary elevational view of a pinsetter control mechanism including switch means in the circuit of the present control;

FIG. 18 is a fragmentary elevational view of a pinsetter control mechanism including switch means in the circuit of the present control;

FIG. 19 is a plan view of a control panel including manually operable switch means in the circuit of the present control; and FIG. 20 is a wiring diagram illustrating the circuit of the present control.

While an illustrative embodiment of the invention is shown in the drawings and will be described in detail herein, the invention is susceptible of embodiment in many different forms and it should be understood that the present disclosure is to be considered as an exemplification of the principles of the present invention and is not intended to limit the invention to the embodiment illustrated. The scope of the invention will be pointed out in the appended claims.

Referring now to the drawings in more detail, the invention is embodied in a pin handling mechanism adapted for use in an automatic pinsetter and including a turret structure generally designated 10 and a conveyor structure generally designated 11 arranged to deliver pins one at a time to the turret structure. The conveyor is adapted to receive pins from a pin gathering mechanism (not shown) for collecting pins in the pit at the end of a bowling alley, elevating the pins to the level of the receiving end of the conveyor and depositing the pins on the conveyor for travel serially with the butts of the pins leading. The turret structure is adapted to deliver as many as a full complement of ten pins to a pinsetter structure (not shown) for setting the pins initially in playing position on the alley, lifting standing pins after a first ball is rolled in order to permit removal of dead wood, and resetting such pins in playing position for the second ball.

The operating parts of the conveyor and turret structures may be supported in any suitable manner, and as illustrated herein are supported by means including a rigidly mounted tubular shaft as at 13 (FIGS. 1 and 2), a similar shaft as at 14 and hangar rods as at 15. Opposite ends of the shafts 13 and 14 may be suitably supported on kickbacks (not shown), and the hanger rods 15 may depend from a suitable superstructure (not shown) also mounted on the kickbacks. In the preferred construction illustrated, a suitably shaped chassis or frame member 17 is supported by attachment to cross shaft 13 as at 18 and includes a pair of diverging arms as at 19 supported by the hanger rods 15.

Intermediate opposite ends of the frame member 17, it includes an annular support 22 on which is mounted a bearing member 23 having an inner race 24 rotatably supporting a tubular member 25 forming the hub of the indexable turret. An annular plate 27 is attached to the upper edge of the hub 25 as by screws 28, for supporting wire rods as at 29 providing nine outer pin receiving pockets spaced around the axis of turret rotation. Lower ends of the wire rods are secured to the plate 27 by means of clamps 31 and upper ends of the wire rods are held securely in position relative to each other by means of clamping plates as at 33. As will be understood on reference to FIG. 1, the pin receiving pockets provided by the wire rod structure 29 are disposed in an annular series concentric around the axis of turret rotation and adapted to receive pins for each of the conventionally numbered pin positions except the #5 pin.

Figure 1:
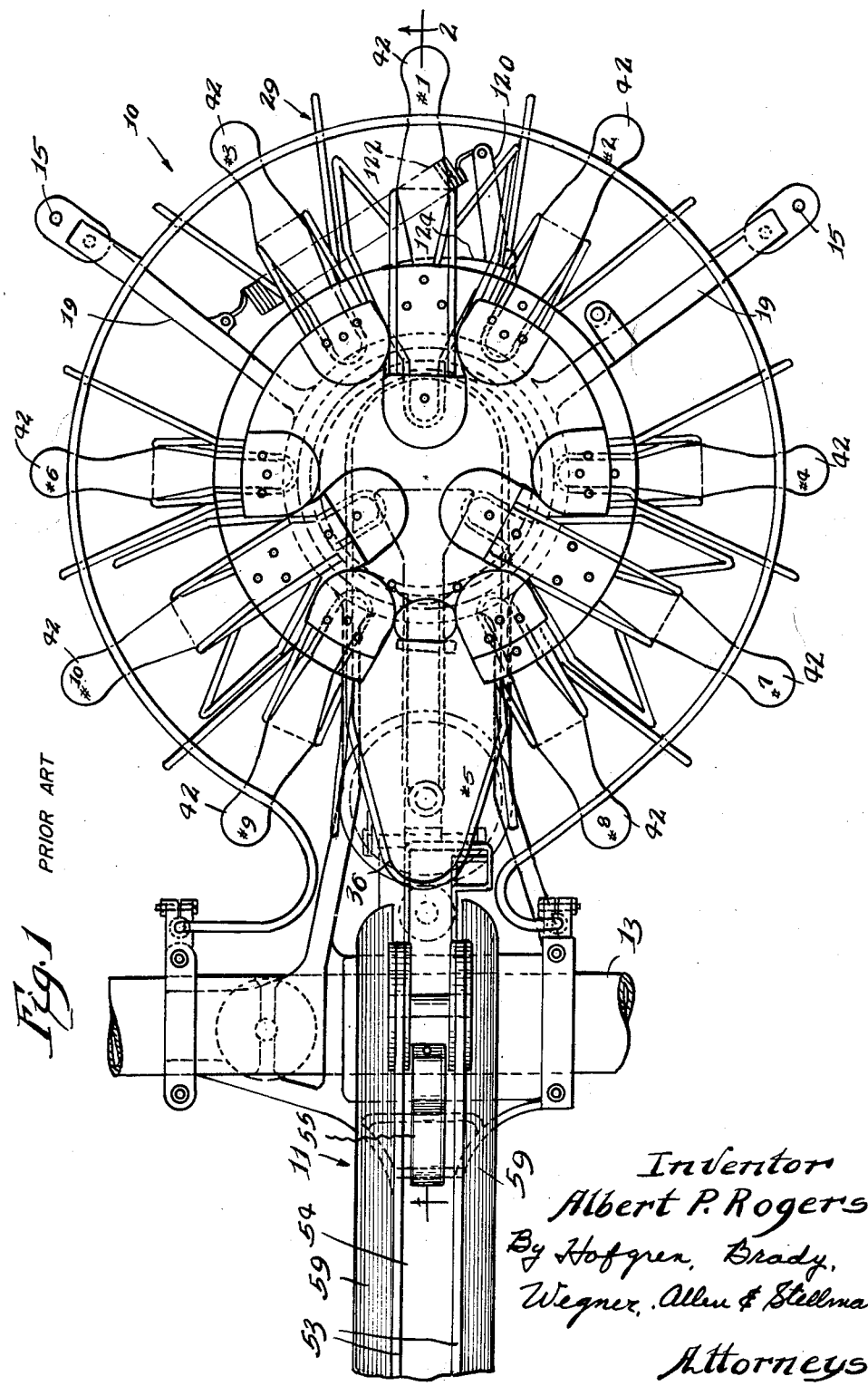
FIG. 1 is a fragmentary plan view of a pin handling apparatus in which there may be incorporated a control embodying the principles of the present invention.
Figure 2:
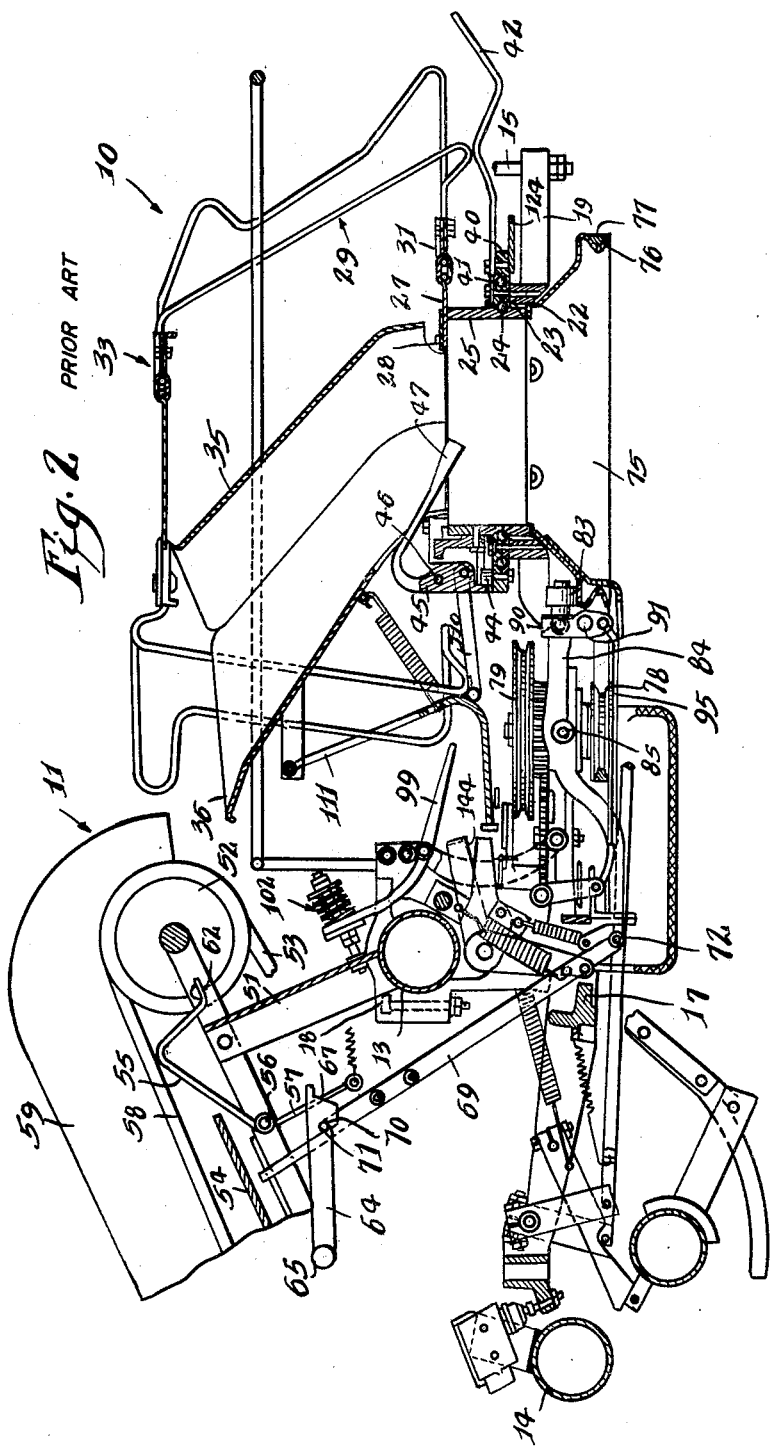
FIG. 2 is a vertical sectional view taken at about the line 2—2 of FIG. 1.

The turret includes a chute 35 for receiving the #5 pin. The lower end of such chute is positioned centrally of the turret and secured to the upper end of the hub member 25. The upper portion of the chute is inclined upwardly and toward the left, when the turret is positioned angularly as illustrated in FIGS. 1 and 2, and terminates at the upper end in a mouth or opening 36 for receiving the #5 pin.

The pin receiving pockets provided as described above are positioned on the indexable turret structure to move successively through a pin receiving station immediately beneath the discharge end of the conveyor structure 11 as the turret is indexed. In operation, the turret is indexed to position one of the receiving pockets at the pin receiving station, whereupon the conveyor delivers a pin to such pocket, after which the turret is again indexed to position the succeeding pocket at the pin receiving station. According to conventional procedure, these steps are repeated until such time as the turret is completely filled with a complement of ten pins.

Figure 4:
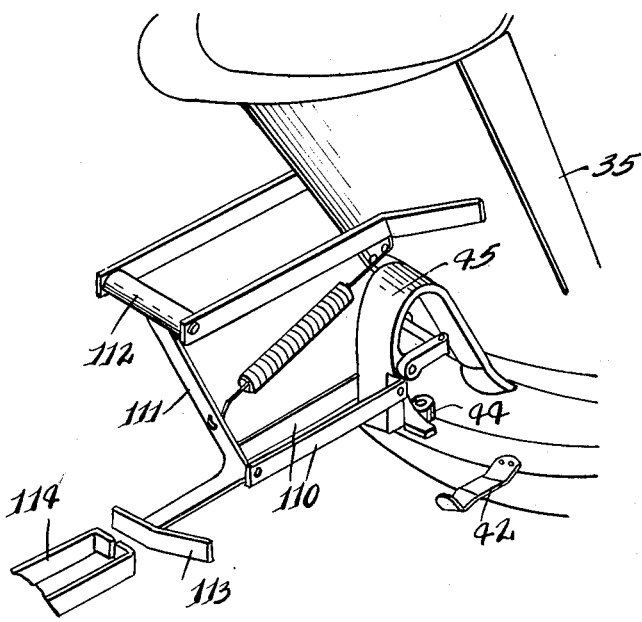
FIG. 4 is a perspective, somewhat diagrammatic view, taken from the left front of FIG. 2, illustrating a latch and trip mechanism controlled by the passage of the last pin to the turret in conventional cycling of the apparatus.
Figure 5:
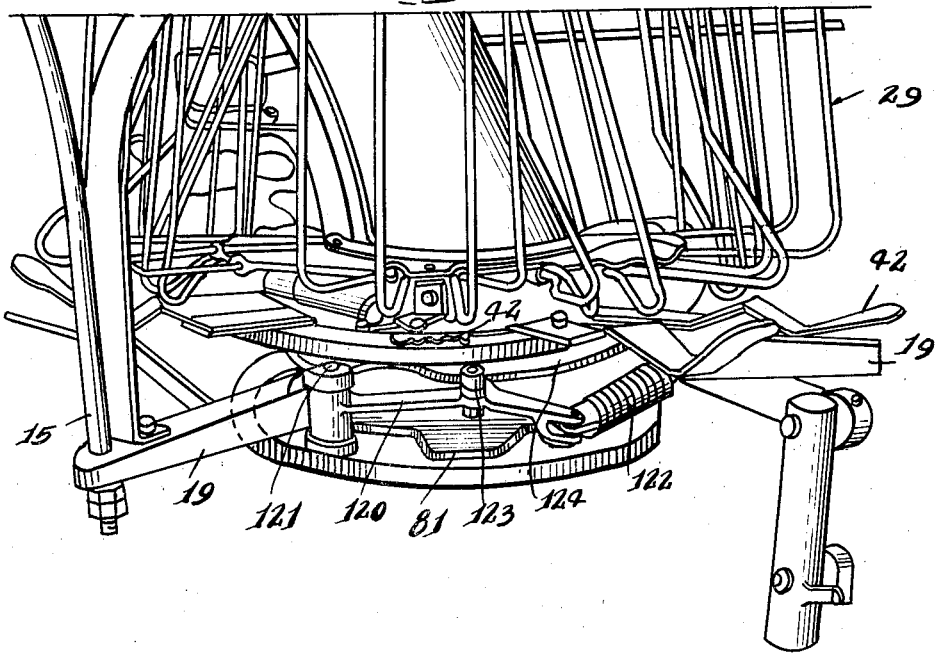
FIG. 5 is a fragmentary perspective view taken from the front of FIG. 1, illustrating a control for the pin supporting means in the turret.

In order to support the pins in the nine outer pin receiving pockets, a spider structure (see also FIGS. 5 and 7) is provided including an annular hub 40 rotatably mounted by means of an outer race 41 on the bearing 23. The hub 41 has nine outwardly projecting fingers or spoons 42 disposed respectively beneath the chutes or guides provided by the wire rods 29 to thereby form the bottoms of the pin receiving pockets. The spoons 42 thus support the pins in the nine outer pockets. While the spider is rotatably mounted for movement relative to the turret hub 25, it is normally latched to the hub 25 for rotation therewith as the turret is indexed. To this end, the spider hub 40 includes a latch roller 44 (FIGS. 2 and 4) adapted for engagement by a latch 45 pivotally mounted on the turret hub 25 as at 46. The latch member 45 carries a trip arm 47 projecting into the chute 35 and engageable by the tenth pin in the series delivered to the turret, for the #5 pin position, to pivot the latch to release the spider for rotation relative to the turret to thereby remove the pin support provided by the spoons 42 in order to release the pins to drop to the deck structure below the turret, as will be explained in more detail presently.

The conveyor means 11 includes a frame 50 preferably supported by a bracket 51 attached to the cross shaft 13 and the frame 50. The frame provides a support for a pair of parallel belt pulleys as at 52, on a common axis, and having a pair of belts 53 trained thereabout. Opposite ends of the belts 53 pass around drive pulleys (not shown) adapted to be continuously driven, so that the belts 53 are continuously driven. The belts are spaced apart by a distance somewhat less than the diameter of a bowling pin at the belly of the pin, so that the large portion of the pin is adapted to rest on the belts, with the base leading, and with the head of the pin falling between the belts and resting on a plate as at 54. The upper reaches of the belts 53 are supported on and travel along ledges as at 58 provided on side plates 59 suitably attached to the conveyor frame. The pins are delivered to the belts 53 by a pin elevator mechanism (not illustrated) which gathers the pins in the pit of the alley and delivers them to the belt one at a time, for delivery to the turret structure in similar fashion, so that the pins fall base first into the pockets on the turret.

In order to control the delivery of pins from the cross conveyor to the turret, so that pins are delivered only one at a time to the turret and may be spaced in time so as to fall only into empty pin receiving pockets on the turret, a pin gate is provided at 55, pivotally mounted on the frame 50 as at 56 and including a lower arm 57 adapted to control the movement of the pin gate by virtue of an interlock with the turret operation, as will be explained presently.

In operation, the pin gate 55 is normally urged in a counterclockwise direction by a return spring 61 secured to the end of the lower arm 57 and suitably anchored on the frame, so that an end portion 62 of the pin gate arm 55 abuts against the frame 60 as best seen in FIG. 8. The pin gate is normally latched in the position described by means of a pin gate latch 64 suitably pivoted on the framework as at 65 and biased in a clockwise direction by means of a spring 66. The latch 64 includes a recessed end portion as at 67 adapted to receive the lower end of the pin gate arm 57, preventing clockwise movement of the pin gate member. With the pin gate latched as described, a pin travelling along the continuously driven belts 53 will be stopped upon engagement with the pin gate arm 55. However, after the turret has indexed to position an empty pin receiving pocket at the pin receiving station beneath the discharge end of the conveyor, the pin gate latch 64 is released to allow clockwise movement of the pin gate under the urge of the pin engaged therewith, so that the pin is permitted to pass to the turret.

The latch 64 is normally held in a latching position by means of a latch spring 66 and is adapted to be released by a latch link 69 having a notch 70 adjacent the upper end thereof engageable with a pin 71 on the latch. The lower end of the link 69 is attached to a movable pivot as at 72, and the link is urged in a clockwise direction by spring 73 suitably anchored on the framework. After the turret is properly indexed to receive a pin from the cross conveyor, the link 69 is moved upwardly to engage pin 71 to thereby pivot the latch in a counterclockwise direction, releasing the lower pin gate arm 57 to permit pivotal movement of the pin gate in a clockwise direction and thereby facilitate passage of a pin along the conveyor.

In order to drive the turret through its indexing steps as it receives a complement of pins, the turret hub 25 is provided with a depending bell-shaped extension 75 formed at the lower end to provide a pulley 76 for receiving a belt 77 trained thereabout and trained about a drive pulley 78. The pulley 78 is interconnected with a driving pulley 79 adapted to be continuously driven by means not illustrated, so that the lower pulley 78 is continuously driven. So long as the turret is free to rotate, the drive described including the belt 77 is effective to turn the turret. However, when the turret is held against rotation, as when stopped to receive a pin, the pulley 78 slips relative to the belt 77.

Indexing movement of the turret under the continuous urge of the driving belt 77 is controlled by means of an indexing cam preferably formed on or attached to the bell-shaped extension 75 and provided with a series of upwardly facing recesses as at 81 (FIGS. 3 and 5) angularly spaced about the axis of the turret at positions corresponding to the positions of the pin receiving pockets. The recesses 81 receive a stop roller 83 carried on the end of a stop lever 84 pivotally mounted on the frame as at 85 and interconnected with the pin gate latch release link 69 as at 72. While the stop roller 83 is held in one of the stop recesses 81, rotation of the turret is prevented, but when the stop lever and the stop roller are free to rise, the tendency of the turret to turn forces the stop roller upwardly, allowing turret rotation.

Figure 3:
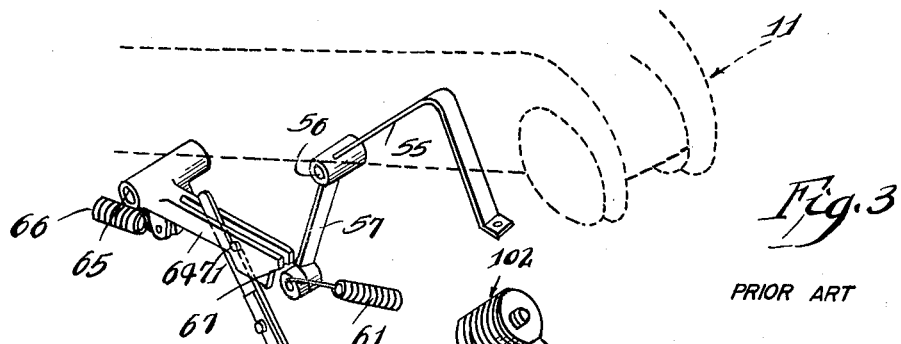
FIG. 3 is a perspective, somewhat diagrammatic view, taken from the right front of FIG. 2 illustrating a latch and trip mechanism for controlling turret indexing and for controlling the passage of pins from the conveyor to the turret.

The stop lever 84 and the stop roller 83 are normally held in the depressed position illustrated in FIGS. 2, 3 and 8 by a latch 90 pivoted at 91 and carrying a latch lug 92 engageable over a latch roller 93 on the stop lever 84. The latch 90 is normally maintained in the latching position illustrated, but may be pivoted in a clockwise direction by means of a latch release mechanism including a latch release link 95 having one end connected to the latch as at 96 and the opposite end connected to a lever 97 pivoted on the frame as at 98. The lever 97 includes an arm connected to a trip mechanism including a trip lever 99 pivoted on the frame as at 100 and connected by a link 101 to the lever 97. A spring mechanism 102 mounted on the bracket 51 urges the trip lever in a counterclockwise direction, elevating the link 101, maintaining the lever 97 in an upper position and thereby maintaining the latch 90 in latching position.

The trip lever 99 is disposed to be engaged by each pin passing from the cross conveyor to the nine outwardly disposed pin receiving pockets on the turret. In this fashion, each pin delivered to one of the nine outer pockets on the turret pivots the trip lever downwardly in a clockwise direction, thereby pivoting the lever 97 also in a clockwise direction to retract the latch release link 95 and pivot the latch 90 in a clockwise direction to release the stop lever 85 to permit the turret to index to position the next pin receiving pocket at the pin receiving station.

As the turret indexes, the stop roller 83 is free to drop into the succeeding depression 81 it encounters and the latch is free to return to latching position so that the turret is stopped with the next pin receiving pocket positioned at the pin receiving station.

Operation of the pin gate 55 on the cross conveyor is interlocked with operation of the turret by virtue of the connection at 72 of the pin gate latch release link 69 with the stop lever 84. As best illustrated in FIG. 3, when the stop lever 84 is pivoted in a counterclockwise direction as the stop roller rides up onto a high part of the indexing cam, the pin gate latch release link 69 is pulled downwardly. As turret indexing continues, and the stop roller 83 rides down into another depression 81 on the indexing cam, the stop lever 84 pivots in a clockwise direction, forcing the pin gate latch release link 69 upwardly. This occurs at about the time that turret indexing is complete. As the link 69 moves upwardly, the notch 70 provided adjacent the upper end thereof engages the pin 71 provided on the pin gate latch 64, thereby to pivot the latch 64 upwardly, releasing the lower arm 57 of the pin gate so that a pin encountering the pin gate arm 55 is effective to pivot the pin gate, allowing passage of the pin to the turret. After the pin passes, the return spring 61 returns the pin gate to a pin blocking position where it is held by the latch 64.

It should be noted that the latch 64 is released from the release link 69 when the lower arm of the pin gate is pivoted in a clockwise direction as a pin passes over the pin gate, as the lower arm of the pin gate engages the latch release link 69 to pivot it in a counterclockwise direction, disengaging the notch 70 thereon from the pin 71 on the latch 64. This allows the latch to fall to a latching position when the pin gate is spring returned to blocking position after the passage of a pin.

Turret indexing and pin travel on the cross conveyor are controlled in the fashion described above while pins are deposited in the nine outer pin receiving pockets on the turret. These pockets, as illustrated in FIG. 1, are for the #9, #10, #6, #3, #1, #2, #4, #7 and #8 pin positions, and pins are delivered to the turret pockets in the order mentioned.

When the chute 35 is indexed to the pin receiving station, to receive a pin for the #5 position, the trip member 99 is not engaged by this pin, and other means are provided to effect indexing of the turret and operation of the pin gate 55. Such other means includes the trip lever portion 47 projecting into the pin chute 35 and engageable by the tenth pin as it enters the chute to pivot lever 47 about pivot 46. The latch and trip member 45 when engaged by a pin in the chute 35 initiates a series of operations which results in dropping the ten pins to the deck structure below after rotation of the spider relative to the turret pockets, followed by an indexing of the turret relative to the spider to reposition the parts for supporting pins, and actuation of the pin gate to permit the passage of the first pin in the next complement.

The latch and trip member 45 is controlled by a mechanism including links 110 (FIG. 4) each having one end pivoted on the member 45 and the opposite end pivotally connected to a lever 111 pivoted as at 112 on the chute 35 and having a probe 113 engageable with a control member 114. The member 114 is provided for the purpose of preventing indexing of the spider relative to the turret to drop the pins in the event that the deck structure situated therebeneath is not suitably prepared for receiving the complement of pins from the turret. In the event that the deck structure is prepared to receive the pins from the turret, the control member 114 is withdrawn from the position illustrated by means (not shown) so that the probe 113 and the latch member 45 are free to move when engaged by a pin in the chute 35.

As previously described, pivotal movement of member 45 when engaged by a pin in the chute 35, releases the latching portion of the member 45 from the turret-spider latch roller 44, the member 45 being carried on the turret, and the roller 44 being carried on the spider. This releases the spider from the turret for movement relative to the turret by a drive means which includes a lever 120 (FIG. 5) pivoted on one frame arm 19 as at 121 and having a free end connected with a tension spring 122 having its opposite end suitably anchored on the other frame arm 19 (see FIG. 5). The arm 120 carries a cam follower roller 123 engageable with the periphery of a cam 124 carried by the spider. The cam 124 is provided with a gradually rising peripheral cam surface 125 (FIG. 7) and at the end of such gradually rising surface a notch or recessed portion 126.

As the turret is indexed while the nine outer pockets are being filled with pins, the gradually rising surface on the cam 124 tensions the spring 122 by forcing the cam roller 123 and the lever 120 in a clockwise direction about the pivot 121. After the ninth pin is delivered to the final outer pin receiving pocket on the turret, and the turret indexes, the cam 124 is positioned so that the follower roller 123 is just entering the recessed portion 126 of the cam. Following this, when the tenth pin is dropped, tripping the latch 45 and releasing the spider from the turret, the tension in the spring 122 forces the roller into the depression 126, causing rotation of the spider relative to the turret to remove the support from the pins in the outer pin receiving pockets on the turret. All ten pins therefore drop to the deck structure below.

In order to again position the turret in register with the pins supporting spider arms or spoons 42, the turret is indexed relative to the spider after all ten pins have been dropped. This is effected by means best illustrated in FIG. 6 including a gear 130 positioned beneath the turret drive pulley 79 and frictionally engaged therewith to turn therewith when free to do so but also adapted to be held against rotation. The gear 130 meshes with a gear 131 carrying a block 132 engaged by a latch 133 pivoted on the frame as at 134 and urged in a counterclockwise direction by a torsion spring 135. The gear latch is normally maintained in a position engaging the block 132 to prevent rotation of the gears 130 and 131. It carries an arm 136 engageable by a trip arm 138 carried on the spider, so that when the spider is indexed relative to the turret, the arm 138 engages the arm 136 to release the latch 133, freeing the gears 130 and 131 for rotation.

Also carried on the gear 131 is a cam block 140 engageable with a roller 141 on an arm 142 depending from the trip member 99 normally engaged by the pins passing to the nine outer pin receiving pockets of the turret. When the cam block 140 engages the roller 141, the indexing trip lever 99 is pivoted to release the turret stop latch member 90, freeing the turret for indexing movement. During the indexing, the pin gate 55 is released in the manner previously described. Also during turret indexing, the spider is held against movement by virtue of the engagement of the cam roller 123 with the bottom of the recessed portion 126 on the spider cam 124. After the turret indexing is complete, the turret-spider latch roller 44 is again positioned for engagement with the latch 45 to thereby latch the turret and spider for movement together.

The mechanism as described above and as illustrated in FIGS. 1–7 is conventional in the sense that it has been used commercially. According to the present invention a control is imposed on the mechanism described above for the purpose of preselectively designating any one or more pin positions at which it is desired that no pins be set. Such a control enables the setting of a selected pin or a group of selected pins, rather than the entire complement of ten pins, for example, for the purpose of enabling a bowler to practice shots at selected pins.

In the form of the invention illustrated in FIGS. 8–11, motor means in the form of a first solenoid mechanism 130 is provided for causing the pin receiving turret to index any or all of the nine outer pin receiving pockets past the pin receiving station while at the same time preventing delivery of a pin from the cross conveyor to the selected pocket or pockets which are not to receive pins. Motor means in the form of a second solenoid mechanism 131 is provided for causing the turret to index the chute 35 past the pin receiving station while preventing delivery of a pin thereto. This mechanism also is effective to cause the pins to be dropped from the turret when no pin is to be delivered to the chute 35.

The first solenoid mechanism 130 preferably comprises a solenoid 133 mounted on the cross shaft 14 and having a plunger pivotally connected at one end to a link 134 in turn pivotally connected to a link 135 in turn connected to the lever 97. Thus, upon energization of the solenoid 133 the links 134 and 135 are pulled toward the left as viewed in FIG. 8 to pivot the lever 97 which, it will be recalled, is effective through the latch release link 95 to pivot the latch member 90 in a clockwise direction, releasing the stop roller 83 and the stop lever 84 to free the turret for indexing rotation. It will be understood that the solenoid mechanism thus described produces the indexing function normally provided by the dropping of a pin from the cross conveyor onto the trip member 99 (FIG. 3), the latter being ineffective to cause turret indexing in the case where no pin is dropped to the turret for the pocket positioned, at the time, at the pin receiving station.

The links 134 and 135 at their pivotal interconnection are also mounted on a lever 138 pivoted on the frame member 17. Also pivotally connected to the lever 138 is a link 139 having its opposite end connected by a pin and slot connection 140 to the pin gate latch release link 69. Through this interconnection, the pin gate latch release link 69 is pivoted in a counterclockwise direction about the pivot 72 whenever the solenoid 133 is energized, thereby to disengage the latch release link notch 70 from the latch pin 71 so that when the stop lever 84 pivots in a counterclockwise direction, and then again in a clockwise direction, to raise the latch release link 69, the latter is ineffective to disengage the latch 64. The result is that the pin gate 55 is not released and a pin is not permitted to pass to the turret pocket positioned at the pin receiving station at the time.

As will be explained presently, a control is provided for selectively energizing the solenoid 133 at the proper time to cause indexing of the turret to move a selected one or more of the nine outer pin receiving pockets past the pin receiving station while preventing delivery of pins to such selected pocket or pockets.

In order to skip the tenth pin receiving pocket, the chute 35, the solenoid mechanism 131 includes a solenoid 145 also mounted on the cross shaft 14, and including a plunger pivotally connected to a link 146 in turn connected to a lever 147 suitably mounted pivotally as at 148. The lever 147 carries an arm 150 having a flange 151 engageable with a roller member 152 on the lever 111, so that when the solenoid 131 is energized, the link 146 is pulled toward the left as viewed in FIG. 8, to pivot the lever 111, and pull the links 110 toward the left to release the turret-spider latch member 45 from the latch roller 144. This action frees the spider from the turret for indexing relative thereto so that the pins which are delivered to the turret may be suitably dropped to the deck structure therebelow even though the pocket 35 receives no pin.

It will be recalled that indexing of the spider relative to the turret initiates a series of operations which result in subsequently indexing the turret relative to the spider to re-position the spider arms in pin supporting positions. These operations follow as described hereinabove.

In order to prevent delivery of a pin to the chute 35 when the solenoid 145 is energized, the solenoid plunger has another link 155 pivotally connected thereto and also connected by a pin and slot connection as at 140 with the pin gate latch release link 69. Thus, on energization of the solenoid, the latch release link notch 70 is disengaged from the pin 71 to prevent release of the latch and thereby prevent passage of a pin from the conveyor to the turret.

The link 155 is normally urged toward the right as viewed in FIG. 8, to an inoperative position, by means of a coiled tension spring as at 160 having opposite ends connected respectively to the link 155 and the frame member 17. The link 146 preferably comprises a first tubular member 146a (FIG. 8a) which has its leftmost end secured to the plunger of the solenoid 145, and its rightmost end telescoped within a tubular member 146b in turn welded or otherwise secured to a flat link portion 146c connected to the lever 147. The member 146a carries a pin 163 slidable in opposed slots 164 in the tubular member 146b. The member 146b carries a pin 165 slidable in opposed slots 166 in the tubular member 146a, and a spring 167 in the tubular member 146a bears at opposite ends against the pins 163 and 165 to normally maintain the parts 146a and 146b relatively positioned as illustrated in FIG. 8a.

In operation, if the control member 114 is withdrawn and is not blocking the clockwise rotation of lever 111 when solenoid 145 is energized, the link 146 acts as a solid link and accomplishes the release of the spider from the turret as described. If the control member 114 is in position to block the clockwise rotation of lever 111 because the deck structure beneath is not suitably prepared to receive pins from the turret, then energization of solenoid 145 causes the tubular member 146a to move to the left relative to member 146b and this action compresses spring 167 which results in a force on tubular member 146b urging it to the left. When the control member 114 is withdrawn, member 146b is allowed to complete its movement to the left to accomplish the release of the spider from the turret.

In order to provide for energization of the solenoids 133 and 145 preselectively at the proper times, both are connected in a control circuit illustrated in FIG. 10 and including a pair of wires as at 170 and 171 connected across a suitable A.C. source. The solenoid 130 is connected across the wires 170 and 171, by a conductor 172 while the solenoid 145 is connected across the wires 170 and 171 by a conductor 173.

Energization of the solenoid 130 is controlled by normally open switch contacts CR-1 in the wire 172 which are in turn controlled by a control relay coil CR in a wire 174 connected across the wires 170 and 171. The arrangement is such that the contacts CR-1 are closed upon energization of the coil CR and open on deenergization of the coil. Energization of the coil CR is controlled by a normally open switch 176 in the wire 174, the contacts of a stepping relay as at ST-1, and selectively operable, manually controllable switches as at 177.

The switches 177 correspond respectively with the #9, #10, #6, #3, #1, #2, #4, #7, and #8 pin positions in the pin receiving turret, these being the nine outer pin receiving pockets. The switches 177 are physically located on a control panel as at 180 (FIG. 11) and are each manually selectively operable in order to designate preselectively one or more pockets to which it is desired that no pins be delivered. The switch contacts of the stepping relay ST-1 include a movable switch arm as at 181 and stationary contacts as at 182 corresponding respectively with the switches 177 and connected thereto as by wires 183. The movable contact arm 181 of the stepping relay is controlled by a coil ST connected across the wires 170 and 171 in circuit with normally open switch contacts 176a and a rectifier 184 so that the coil is supplied by D.C. power.

Energization of the control relay CR and the stepping relay ST is controlled by a cam 187 mounted on the bell shaped turret member 75 (FIG. 8), for rotation therewith and carrying a plurality of cam lobes as at 188 engageable with a switch operating arm 176b for the purpose of closing the switch contacts 176 in timed relationship with indexing movement of the turret. A movable switch operating arm 176c is connected as at 189 for operation with switch arm 176b to close the contacts 176a each time the contacts 176 are closed, in order to provide energization of the stepping relay ST when the control relay CR is energized.

In operation, when the turret is indexed to position the #9 pin receiving pocket at the pin receiving station, the lobe 188 on the cam 187 corresponding to the #9 turret pocket engages the switch actuating arm 176b to close the contacts 176. If at this time the selective switch 177 corresponding to the #9 pin position has been closed, a circuit is completed through the contacts 181 and 182 of the stepping relay ST-1, to energize the control relay CR. This closes the contacts CR-1, energizing the solenoid 130 so that no pin is delivered to the #9 pocket, and the turret is indexed past this pocket without receiving a pin. In similar fashion, as indexing of the turret continues pin delivery is prevented to any of the nine outer pin receiving pockets corresponding to those switches 177 which have been preselectively manually closed. As the switch contacts 176a are closed each time a lobe 188 on the cam 187 passes the switch operating arms 176b, the stepping relay ST is energized to maintain the movable switch arm 181 in step with the cam 187 and the indexing turret.

In the circuit illustrated in FIG. 10, use is made of a commercially available stepping relay which includes eleven stationary contacts 182, rather than only nine which are necessary in the operation described above. Accordingly, two of these stationary contacts 182 are left unconnected, as illustrated at the two positions between the contacts corresponding to the #9 and #10 pin positions. In order to step the movable contact arm 181 across the two contacts 182 which are not utilized, the stepping relay map include an additional set of switch contacts as at ST-2 including a movable arm 181a engageable with stationary contacts as at 182a. In positions corresponding to the two contacts which are not utilized as explained above, two of the contacts 182a are connected in circuit with the rectifier 184, the coil ST, and normally closed switch contacts ST-3 which are controlled by the coil ST.

In operation, when the switch arm 181 is stepped from the position illustrated in FIG. 10, the arm 181a is stepped to engage a contact 182a in circuit with the rectifier 184. This causes energization of the coil ST even though the cam 187 is not indexed, since the contacts ST-3 are closed at this time. Shortly thereafter, energization of the coil ST causes the contacts ST-3 to open, de-energizing the coil ST. Immediately, the contacts ST-3 again close and again energize the coil ST and again step the contact arm 181a to the second of the two contacts which are connected in circuit with the rectifier 184. This is repeated once more, and this brings the arm 181 to the contact corresponding to the #10 pin positon. It should be noted that the arms 181 and 181a are movable together as illustrated by the interconnection 192. It will be understood that where the stepping relay utilized as at ST-1 includes an appropriate number of switch contacts there would be no need for the relay portion illustrated at ST-2.

As noted above, the operation previously described provides for omission of pin delivery to any of the nine outer pin receiving pockets. In order to provide for energization of the solenoid 145 which controls selective omission of pin delivery to the tenth pin receiving pocket or chute 35, this solenoid is in circuit with a normally open switch 195 operable by means of a cam as at 196 movable with the circular cam 187 and adapted to be closed as the turret is indexed to position the chute 35 at the pin receiving station. The solenoid 145 is also in circuit with a manually selectively operable normally open switch 197 corresponding to the #5 pin position. Thus, if the selectively operable switch 197 is closed at the time the turret is indexed to position the chute 35 at the pin receiving station, the solenoid 145 is energized and as previously described is effective to cause indexing of the spider to drop the pins to the deck structure, while preventing delivery of a pin to the chute 35, and thereafter to index the turret relative to the spider to position the #9 pin receiving pocket for receiving the first pin, if desired, in a succeeding cycle of operation.

The form of the invention illustrated in FIGS. 12–20, like that illustrated in FIGS. 8–11, is shown as applied to a pin handling mechanism such as that illustrated in FIGS. 1–7, which may be of the type disclosed in Huck et al. 2,949,300, and accordingly parts illustrated in FIGS. 12–20 which correspond to similar parts illustrated in FIGS. 1–11 are designated with corresponding reference numbers having a prime suffix.

Referring now to FIG. 12, a first solenoid mechanism 200 is provided for selectively preventing delivery of a pin from the cross conveyor 11' to any of the pockets 29' or 35' associated with the turret 10', while the selected pocket is indexed past the pin receiving station. A second solenoid mechanism 201 is provided for causing the pin receiving turret 10' to index any selected pocket or pockets of the nine outer pin receiving pockets past the pin receiving station without receiving a pin from a cross conveyor 11'. A third solenoid mechanism 202 is provided for causing the turret to index the chute 35' past the pin receiving station without receiving a pin from the cross conveyor. The latter mechanism is also effective to cause the pins to be dropped from the turret to a deck structure therebelow (not shown) when no pin is to be delivered to the chute 35'.

The first solenoid mechanism 200 includes a solenoid 210 having a plunger 211 connected with a link 212 in turn connected to a spring 213 suitably anchored on the frame member 51' and tensioned to normally maintain the plunger 211 and the link 212 in an elevated position relative to that illustrated in FIG. 12. Link 212 is also connected with a lever 214 pivoted on the frame member 51' and formed with a downwardly opening notch 215 adapted to engage a roller 216 at the end of pin gate arm 57' when moved from an elevated position (not shown) to the position illustrated in FIG. 12 in order to latch the pin gate 55', 57' in the pin blocking position illustrated. When the solenoid 210 is de-energized, the arm 214 is elevated to a position wherein the notch 215 is disengaged from the roller 216, permitting pivotal movement of the pin gate arm 57', if released by the latch member 64', when the gate member is urged in a clockwise direction by a pin on the conveyor 11'. The arrangement is such that on a timely energization of the solenoid 210 passage of a pin from the conveyor 11' to any selected pocket on the turret is prevented. As will be explained presently, a control is provided for effecting such timely energization of the solenoid 210 coincidentally with energization of either of the solenoid mechanisms 201 or 202.

The second solenoid mechanism 201 comprises a solenoid 205 having a plunger suitably connected to a link 206 in turn pivotally connected as at 207 to an arm extension 208 fixed for pivotal movement with the trip member 99' normally engaged by each pin passing from the cross conveyor 11' to one of the nine outer pin receiving pockets 29'. Thus, upon energization of the solenoid 205 the link 206 is moved toward the left as viewed in FIG. 12, moving the arm 208 and trip member 99' to the positions illustrated in full line in FIG. 12. Referring particularly to FIG. 3, it will be recalled that clockwise movement of the trip member 99' in this fashion is effective through the latch release link 95' (FIG. 12) to pivot the latch 90' in a clockwise direction, releasing the stop roller 83' and the stop lever 84' to free the turret for indexing rotation. It will be understood that the solenoid mechanism thus described produces the indexing function normally provided by the dropping of a pin from the cross conveyor onto the trip member 99'. The latter is returned to the broken line position illustrated in FIG. 12 by the spring mechanism 102'.

Solenoid 205 is mounted on a suitable extension 204 of the frame member 17'. Solenoid 210 is mounted on a suitable bracket supported by frame member 51'.

A third solenoid mechanism 202 includes a solenoid 220 suitably mounted on the underside of the chute 35' and having a plunger connected as by a tension spring 221 to an extension 22 fixed for movement with the trip member 45', 47' to pivot the latter in a clockwise direction as viewed in FIG. 12 about pivot 46' to simulate the pivotal movement normally given to this member upon passage of a pin from the cross conveyor 11' to the chute 35'. This action frees the spider for indexing movement relative to the turret so that the pins which are delivered to the turret may be suitably dropped to the deck structure therebelow even though the pocket 35' receives no pin.

It will be recalled that indexing of the spider in the manner described immediately above initiates a series of operations which result in subsequently indexing the turret relative to the spider to reposition the spider arms in supporting positions and to index the #9 pocket of the turret to the pin receiving station beneath the end of the cross conveyor 11'.

In order to provide for energization of the solenoid mechanisms 200, 201 and 202 in timed relationship with the indexing of the turret 10' a switch mechanism 230 is mounted atop the turret 10'. As illustrated in FIGS. 13-15, the switch mechanism 230 includes a timing switch assembly 231 providing for energization of the solenoid mechanisms in timed relationship with indexing of the turret and a commutator assembly for supplying power to the solenoid mechanism 202 mounted on the center pin chute 35'.

The switch mechanism 230 comprises a generally triangular mounting 235 supported on the clamp assembly 33' and secured thereto as at 236 for rotation therewith. Attached to the mounting plate 235 as at 237 is a support 238 for slip rings 239 and 240 rotatable with the turret and forming a part of the commutator assembly 232. Conductors 241 and 242 are attached respectively to the slip rings 239 and 240, and are bound in a cable 243 leading to the solenoid 220 to supply power thereto. Also supported on the mounting plate 235 for rotation therewith is a cam shaft 245 having fixedly mounted thereon for rotation therewith a stack of twelve cams 246 forming a part of the timing switch assembly 231 and associated with switches as at 247 to operate the latter upon rotation of the cam shaft.

The cam shaft 245 is mounted for rotation in bearings as at 250 provided in a stationary housing 251 supporting the switches 247. The housing 251 is supported on the cam shaft 245 by means of the bearings 250 and is maintained stationary against rotation by means including a U-shaped bracket 253 secured to the top of the housing and having pivotally attached thereto as at 254 a strap 255 having its upper end mounted by means of a pin and slot connection 256 in a bracket 258 secured to a terminal box 259 suitably mounted stationarily over the machine. The function of the strap 255 is to prevent rotation of the housing 251 during indexing rotation of the turret, while still allowing limited upward movement of the turret in the event of a pin jam, such upward movement being permitted by virtue of the pin and slot mounting of the upper end of the strap at 256.

Power is supplied through the slip rings 239 and 240 of the commutator assembly 232 to the solenoid 220 by means including a pair of contacts 265 and 266 mounted in the bottom wall 267 of the housing 251 and engaging the slip rings 239 and 240 respectively. The contacts in turn are connected with wires 269 and 270 bound in a cable 271 leading to the terminal box 259.

The timing switch assembly 231 includes a stack of twelve cams 246 and the associated switches arranged in two stacks 247a and 247b diametrically opposed at opposite sides of the cam shaft 245, as best seen in FIG. 13. The switches 247 each comprise a pair of normally open contacts, one formed with an extension as at 275 adapted for engagement by the associated cam 246 to close the contacts at an appropriate time dependent upon rotation of the cam shaft 245 with the indexing turret. As seen in FIG. 13, the switches are connected by wiring as at 276 bound into a cable 277 leading to the terminal box 259.

In each stack, the switches 247 are vertically spaced so that adjacent switches cooperate respectively with every other cam in the stack 246a, while the adjacent switches in the other stack cooperate respectively with the remaining, intervening cams in the stack 246b. Ten of the cams and associated switches correspond respectively with the ten pin positions on the alley as these are conventionally numbered, as well as similar pin positions on the turret, and have been numbered accordingly in the view of the cam in FIG. 15 and in the showing of the switches in the wiring diagram of FIG. 20. Cam and switch #11 are used in conjunction with the #5 cam and switch, while the #12 cam and switch are provided for a purpose which will appear presently.

FIG. 15 comprises a series of horizontal sectional views taken respectively above each of the cams on the shaft 245 beginning with the topmost cam at the left of FIG. 15 and continuing consecutively to the bottommost at the right of FIG. 15. Bearing in mind that the pin delivery cycle to the turret is begun with the #9 pin, and remembering that alternate cams in the stack cooperate with switches in alternate stacks, it will be understood that with the cam shaft 245 rotating in a counterclockwise direction as viewed in FIGS. 13 and 15, and beginning with the #9 cam and switch, the cams are effective in the order designated immediately therebeneath, as 1st, 2nd, etc., to operate the corresponding switches in a similar order, until completion of the pin delivery cycle at the #5 pin position in the turret and continued rotation again to the #9 position, from where the cycle started.

Referring now to FIG. 19, when it is desired to bowl at certain selected pins, selection is attained by means of switches 280 illustrated herein as toggle switches physically located upon a panel 281 conveniently situated for access at the bowler's end of the alley, the switches corresponding respectively with the pin positions on the alley and being arranged in a triangular array corresponding to the pin arrangement on the alley and being connected in the wiring diagram of FIG. 20. As illustrated, the switches in the circuit of FIG. 20 are normally closed and are opened at those positions where it is desired that pins be set. Also provided on the panel 281 is an "Off-On" switch 283 for rendering the selective pinsetting control either ineffective or effective, and a "frequent Change" switch 284 for use where the bowler may not wish to bowl repeatedly at the same set-up but instead at frequently changed setups, as will be explained hereinafter.

Referring to FIG. 16, in order to hold a pin-setter of the type illustrated in the previously mentioned Huck et al. Patent 2,949,300 at all times during selective pin bowling in a mode of operation corresponding to that normally following the second ball in conventional bowling, the pinsetter may be provided with a solenoid 285 connected as by a link 286 to an extension 494 of a latch 492, corresponding respectively to the extension 494 and the latch 492 in the patent mentioned, to move the latch in a clockwise direction from the position illustrated in FIG. 16 to a position providing second ball operation in the manner set forth in the patent. This assures that during selective pin bowling, after each ball is rolled the selective pin setup is again repeated without the need for the pinsetter to go through cycling normally providing for the rolling of two balls if these are necessary to knock down the pins. As will appear, the solenoid is connected in the circuit of FIG. 20.

In order to cycle the automatic pinsetter in preparation for selective pin bowling upon closure of the "Off-On" switch 283, the wiring diagram of FIG. 20 includes a "Recycle" relay 288 adapted for controlling contacts (not shown) for effecting energization of a solenoid as at 580 in the Huck et al. Patent 2,949,300.

Also facilitating adaptation of the selective pinsetting control to a pinsetter of the type disclosed in the aforementioned patent, are a pair of microswitches 290 and 291 illustrated physically in FIG. 17, each including a switch actuating arm as at 292. The switches are arranged for actuation respectively at 90° and 170° in the pinsetter cycle by means of cams 294 and 295 respectively, both secured on a shaft as illustrated at 126a in the patent referred to. As shown and described in the Huck et al. patent, shaft 126a, also designated 126a in the patent, and which may be referred to as the rake lift shaft, is rotated during operation of the pinsetter rake to sweep deadwood from the playing surface into the pit. The patent also explains that the pinsetter is adapted for operation through a 360° cycle, more or less, following the rolling of each ball. The shaft 126a occupies predetermined angular positions respectively at 90° and 170° in such 360° cycle and thus, by proper location of cams 294 and 295 on the shaft, the latter may be relied upon to operate switches 290 and 291 at 90° and 170° in the cycle. The purpose of these switches will become apparent presently.

Figure 6:
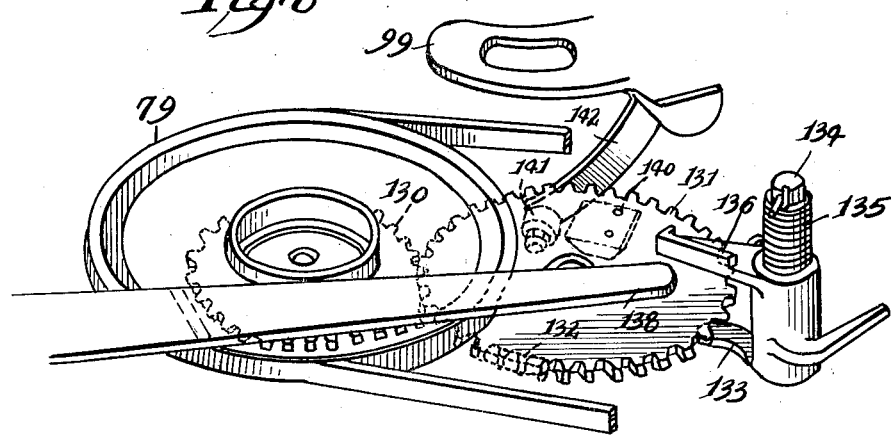
FIG. 6 is a fragmentary, somewhat diagrammatic view taken from the rear of FIGS. 1 and 2, illustrating a mechanism controlling turret indexing after delivery of the last pin to the turret in conventional cycling.

The circuit of FIG. 20 also includes a mercury switch 300 illustrated physically in FIG. 18 as supported on a bracket 301 secured to an arm as at 282 in the Huck et al. patent and adapted for closure when the pinsetter deck is filled with pins to indicate the existence of this condition and adapted to open when the pinsetter deck is not filled. As explained in the Huck et al. patent at column 9, lines 43–66, and as shown in FIGS. 6 and 7 of the patent, arm 282, also designated 282 in the patent, pivots in a counterclockwise direction when pins are dropped from the turret to the deck and is held there until pins are set by the deck whereupon the arm returns to the position illustrated. In the present apparatus, pivotal movement of the arm in a counterclockwise direction is relied on to tilt mercury switch 300, closing it, to indicate a deck loaded condition, whether the deck is loaded with ten pins or less than ten. When the pins in the deck are dropped, return of arm 282 opens switch 300. The purpose of this switch will become apparent presently.

As illustrated in FIG. 20, the circuit includes wires as at 303 and 304 connected across a 230 volt source and to the primary of a transformer T, the secondary of which has wires as at 305 and 306 connected thereacross, providing a 24 volt source. In operation, when it is desired to bowl at selected pin setups, the desired pins are chosen and the corresponding switches 280 on the panel 281 are moved from the normally closed positions illustrated to open positions, and the master switch 283 is moved from the normally open position to a closed position. Closure of the switch 283 energizes a relay 4CR connected across the wires 305 and 306. Energization of the coil 4CR results in closure of its contacts 4CR1 in circuit with the solenoid 285 and closure of its contacts 4CR2 in circuit with the "Recycle" relay 288. Closure of the contacts 4CR1 results in energization of the solenoid 285 which in turn acts upon the extension 494 (FIG. 16) to place the pinsetter in a mode of operation at all times simulating that normally following the second ball in a frame, so that following each ball new pins will be placed on the alley during selective pin bowling. Closure of the contacts 4CR2 results in energization of the relay 288 through normally closed contacts 6CR1, and energization of this relay results in actuation of contacts (not illustrated) providing for energization of the solenoid 580 in the Huck et al. patent to cycle the pinsetter.

Assuming closure of the switch 283 at a time when the pinsetter is at rest at zero degrees in its 360° cycle, the switch 290 is closed momentarily at 90° in the pinsetter cycle to energize the relay 6CR, opening the contacts 6CR1 in circuit with the relay 288 to prevent further energization of this relay, and closing the contacts 6CR2 to provide a holding circuit maintaining energization of the coil 6CR throughout selective pin bowling.

Normally, each automatic pinsetter is utilized with two complete sets of pins, numbering twenty, in order to provide for pinsetting as rapidly as possible following the rolling of each ball. Thus, assuming that at the time the master switch 283 is closed there is a set of pins on the alley and a set of pins in the pinsetting deck or in the turret 10', the cycling of the pinsetter will cause the pins on the alley to be swept off the alley, following which the pins in the deck or in the turret are set upon the alley. These pins may either be bowled off or removed by recycling the pinsetter by means of a manually accessible button conventionally provided for this purpose. The apparatus is thus prepared for selective pinsetting.

At this time, assuming the turret to be positioned at a starting position with the #9 pin pocket positioned beneath the end of conveyor 11' at the pin receiving position, when pins become available at the end of the conveyor selective pin delivery to the turret will be initiated. Assuming, for example, that it is desired to set only the #2 and the #5 pins for practice bowling, the switches 280 corresponding to these pins will have been moved to open positions, while the remaining switches 280 are left in the normally closed positions. The #9 cam 246 (FIG. 15) will provide for closure of the #9 switch 247 (FIG. 20), completing a circuit through the

9 switch 280 to energize a control relay 1CR. Contacts 1CR2 in circuit with the solenoid 210 are closed to prevent pin delivery to the #9 pocket, and contacts 1CR1 in circuit with the solenoid 205 are closed to index the turret. Thus, no pin is delivered to the #9 pocket. In similar fashion, as the turret indexes past the pin receiving station, no pins are delivered to the #10, the #6, the #3 and the #1 pockets.

As the #2 pocket is indexed into the pin receiving station, the #2 switch 247 is closed, but the corresponding #2 switch 280 is open, so that the coil 1CR is de-energized, leaving the contacts 1CR2 and 1CR1 open. Thus, the solenoids 220 and 205 are not energized to prevent pin delivery to the #2 pocket. The pin passes the pin gate, tripping the member 99' and indexing the turret to position the #4 pocket at the pin receiving station. As the #4 switch 280 is closed, no pin is delivered to the #4 pocket. In similar fashion no pins are delivered to the #7 and #8 pockets.

As a turret indexes to position the #5 pocket at the pin receiving station, the #5 cam 246 provides for closure of the #5 switch 247 and the #11 cam provides for closure of the #11 switch, but since the #5 switch 280 has been opened, the #5 and #11 switches 247 are ineffective. Thus, a pin passes to the #5 pocket tripping the member 47' which, it will be recalled, provides for indexing of the pin supporting spider relative to the turret to drop the pins from the #2 and #5 pockets to the deck therebelow, and following this, indexing of the turret to position the #9 pocket at the pin receiving station and again placing the turret in a position where the spider supports pins delivered to the turret.

In the case where the #5 switch 280 is not open, closure of the #5 and #11 switches 247 on indexing the #5 pocket to the pin receiving station provides for energization of relays 2CR and 3CR respectively, closing contacts 2CR1 in circuit with the solenoid 210 and closing contacts 3CR1 in circuit with the solenoid 220. Energization of the solenoid 210 prevents pin delivery to the #5 pocket and energization of the solenoid 220 provides for indexing of the pin supporting spider relative to the turret to drop the pins selected, and a following indexing of the turret relative to the spider as previously described.

The mode of operation described immediately above is normally employed when the bower wishes to bowl repeatedly for an extended period of time at a particular selected pin setup. During selective pin bowling, it is preferable that the pinsetter utilize only a single complement of ten pins, but due to the fact that each pin setup will normally only utilize a few of the ten pins employed, the mode of operation described will provide for rapid resetting of the selected pin setups following the bowling of each ball. For example, if the selective setup includes three pins, three pins may be positioned on the alley, three in the pinsetter deck and three in the turret so that after the rolling of each ball the next setup may be immediately positioned without the necessity for either the deck or the turret waiting for pins from the pit. Specifically, it is contemplated that following the rolling of each ball, another pin setup may be positioned in approximately nine seconds.

On the other hand, if the bowler wishes to frequently change the pin setup for practice bowling, provision is made in the circuit for accomplishing this as rapidly as possible without the necessity of bowling off the previous selection repeatedly before obtaining the new selection. This provision includes the "Frequent Change" switch 284.

Assuming closure of the switch 284, upon completion of delivery of each selected set of pins to the turret, and indexing of the turret to again reposition the #9 pocket at the pin receiving station, the #12 cam 245 provides for closure of the #12 switch 247, completing a circuit to the relay 5CR which in turn closes its contacts 5CR3 providing a holding circuit through the normally closed switch 291. Energization of the coil 5CR also closes the contacts 5CR1 in circuit with the solenoid 210 and opens the contacts 5CR2 in circuit with the solenoid 205. Energization of the solenoid 210 locks the pin gate so that no pins can be delivered to the turret and de-energization of the solenoid 205 prevents indexing of the turret. The coil 5CR is maintained energized until such time as the switch 291 is opened at 170° in the pinsetter cycle. This means that following the setting of a selected group of pins on the alley, no further pins are delivered to the turret until the bowler has bowled off the set pins and the pinsetter goes through the motions of sweeping the alley clean. Following this, the pinsetting deck according to normal operation as described in the Huck et al. patent is lowered to position a new set of pins, but since no pins are in the deck it remains at 180° of its cycle in an elevated position awaiting pins. Delivery of the pins may begin at 170° of the cycle when the switch 291 is opened, de-energizing the coil 5CR and allowing selective delivery to the turret in the manner previously described. Thus, before the bowler rolls at any particular setup on the alley he may change the selection and following the rolling the next setup will be the new selection. This is in comparison to the operation previously described where, in addition to the pins on the alley, the deck may contain another set and the turret still another, requiring that the bowler roll off two setups of the previous selection before obtaining the new selection. This mode of operation may require as much as 25 seconds to set new pins after the rolling of a ball.

In order to facilitate changeover from rapid bowling to the frequent change operation, the circuit of FIG. 20 includes the switch 300 which is closed when the deck is loaded and opened when the deck is not loaded. Thus, assuming the bowler has been operating under the rapid mode, and changes to the frequent change operation, with one set of pins on the alley, one on the deck and one loading in the turret, the deck switch 300 will be closed by virtue of the loaded deck, and the #12 cam switch 247 will close on completion of turret loading, energizing the relay 5CR and holding this energized to prevent pin delivery and indexing until such time as the deck and the turret have been cleared of pins. When the deck and turret are cleared, the apparatus is then free to deliver pins to the turret according to the selection.

I claim:

1. A bowling pin handling apparatus, comprising, a turret indexable about an upright axis and having a plurality of pin receiving pockets arranged in predetermined positions relative to the axis to move successively past a pin receiving station, a conveyor having a discharge end disposed to deliver pins successively to the turret pockets at the pin receiving station, means responsive to the passage of each pin from the conveyor to a pin receiving pocket at the pin receiving station for indexing the turret to advance the next pocket to the pin receiving station, means normally operative to block the passage of pins on the conveyor and conditionable in response to turret indexing to permit the passage of a pin to the turret, solenoid means operable in timed relationship with turret indexing and connected for controlling the first recited means to index any selected pocket past the pin receiving station while controlling the second recited means to prevent delivery of a pin from the conveyor to said selected pocket, and manually operable switches corresponding respectively with said pockets in circuit with said solenoid means, and selectively conditionable to designate the pockets at which the solenoid means is to be operated.

2. A bowling pin handling apparatus, comprising, a turret indexable about an upright axis and having a plurality of pin receiving pockets arranged in predetermined positions relative to the axis to move successively past a pin receiving station, a conveyor having a discharge end disposed to deliver pins successively to the turret pockets at the pin receiving station, means responsive to the passage of each pin from the conveyor to a pin receiving pocket at the pin receiving station for indexing the turret to advance the next pocket to the pin receiving station, means normally operative to block the passage of pins on the conveyor and conditionable in response to turret indexing to permit the passage of a pin to the turret, solenoid means for controlling the first recited means to index a selected pocket past the pin receiving station while controlling the second recited means to prevent delivery of a pin from the conveyor to said selected pocket, preselectively manually operable switch means corresponding respectively with the pin receiving pockets and in circuit with the solenoid means, and switch means operating in timed relationship with turret indexing for completing a circuit to the solenoid means through any operated manual switch means.

3. A bowling pin handling apparatus, comprising, a turret having a plurality of pin receiving pockets arranged in predetermined positions around an upright axis and one other pocket at the axis, means mounting the turret for indexing movement about the axis to successively move said plurality of pockets and then said other pocket past a pin receiving station, a spider having arms for supporting pins in said plurality of pockets, latch means normally latching the spider to the turret for movement therewith, spring loaded drive means for rotating the spider relative to the turret when the latch means is released thereby to release the pins, a continuously moving conveyor having a discharge end disposed to deliver pins successively to the turret pockets at the pin receiving station, means continuously tending to index the turret, latch means normally preventing turret index, first trip means responsive to the passage of a pin from said conveyor to each of said plurality of pockets at the pin receiving station for releasing the turret latch means to advance the next pocket to the pin receiving station, second trip means responsive to the passage of a pin from said conveyor to said other pocket at the pin receiving station for releasing the spider latch means and the turret latch means to thereby release the pins and index the turret, a pin gate for blocking the passage of pins on the conveyor, latch means normally locking the pin gate in blocking position, release means responsive to turret indexing for releasing the gate latch means to permit the passage of a pin to the turret, first solenoid means for controlling the first trip means to index any preselected pocket of said plurality of pockets past the pin receiving station while preventing the delivery of a pin from the conveyor to said preselected pocket, second solenoid means for controlling the second trip means to drop the pins and index said other pocket past the pin receiving station while preventing delivery of a pin thereto, preselectively manually operable switches corresponding respectively with the plurality of pin receiving pockets and in circuit with said first solenoid means, a preselectively manually operable switch corresponding to said other pin receiving pocket in circuit with said second solenoid means, and switch means operating in timed relation with turret indexing for completing a circuit to the solenoid means through any operated manual switch.

4. A bowling pin handling apparatus, comprising, an indexable receiver having a plurality of pin receiving pockets arranged in predetermined positions to move successively past a pin receiving station, a conveyor having a discharge end disposed to deliver pins successively to the receiver pockets at the pin receiving station, means responsive to the passage of each pin from the conveyor to a pin receiving pocket at the pin receiving station for indexing the receiver to advance the next pocket to the pin receiving station, means normally operative to block the passage of pins on the conveyor and conditionable in response to receiver indexing for passing a pin to the receiver, electrical means for controlling the first recited means to index any receiver pocket past the pin receiving station while controlling the second recited means to prevent delivery of a pin from the conveyor to said pocket, preselectively manually controllable switch means corresponding respectively with the pin receiving pockets and in circuit with the electrical means, and switch means operating in timed relationship with receiver indexing for completing a circuit to the electrical means through any selected manual switch means.

5. A bowling pin handling apparatus, comprising, an indexable receiver having a plurality of pin receiving pockets arranged in predetermined positions for movement successively past a pin receiving station, a conveyor having a discharge end disposed to deliver pins successively to the receiver pockets at the pin receiving station, first means normally operative to block the passage of pins on the conveyor and conditionable in response to receiver indexing to permit the passage of a pin to the receiver, second means responsive to the passage of each pin from the conveyor to a pin receiving pocket at the pin receiving station for indexing the receiver to advance the next pocket to the pin receiving station, one selectively operable electrical means energizable in timed relation with receiver indexing for controlling said first means to prevent delivery of a pin from the conveyor to any selected pocket and another separate selectively operable electrical means energizable in timed relationship with said one electrical means for controlling said second means to index said selected pocket past the pin receiving station, and manually operable switches corresponding respectively with said pockets connected to control said electrical means, and selectively conditionable to designate the pockets at which the electrical means are to be operated.

6. A bowling pin handling apparatus, comprising, a turret indexable about an upright axis and having a plurality of pin receiving pockets arranged in predetermined positions relative to the axis to move successively past a pin receiving station, a conveyor having a discharge end disposed to deliver pins successively to the turret pockets at the pin receiving station, means responsive to the passage of each pin from the conveyor to a pin receiving pocket at the pin receiving station for indexing the turret to advance the next pocket to the pin receiving station, means normally operative to block the passage of pins on the conveyor and conditionable in response to turret indexing to permit the passage of a pin to the turret, first electrical means for controlling the first recited means to index any turret pocket past the pin receiving station, second electrical means for controlling the second recited means to prevent delivery of a pin from the conveyor to said pocket, preselectively manually controllable switch means corresponding respectively with the pin receiving pockets and in circuit with the electrical means and switch means corresponding respectively with the pin receiving pockets and operating in timed relationship with turret indexing for completing a circuit to the electrical means through any selected manual switch means.

7. A bowling pin handling apparatus, comprising, a turret having a plurality of pin receiving pockets arranged in predetermined positions around an upright axis and one other pocket at the axis, means mounting the turret for indexing movement about the axis to successively move said plurality of pockets and then said other pocket past a pin receiving station, means movable with the turret for supporting pins in said plurality of pockets and movable relative to the turret to release the pins to drop below the turret, a conveyor having a discharge end disposed to deliver pins successively to the turret pockets at the pin receiving station, first means responsive to the passage of a pin from said conveyor to each of said plurality of pockets at the pin receiving station for indexing the turret to advance the next pocket to the pin receiving station, second means responsive to the passage of a pin from said conveyor to said other pocket at the pin receiving station for moving the supporting means relative to the turret and for indexing the turret to advance the first of said plurality of pockets to the pin receiving station, third means normally blocking the passage of pins on the conveyor and conditionable in response to turret indexing to permit the passage of a pin to the turret, first electrical means for controlling the first responsive means to index any preselected pocket of said plurality of pockets past the pin receiving station without receiving a pin, second electrical means for controlling the second responsive means to drop the pins and index said other pocket past the pin receiving station without receiving a pin, third electrical means for controlling said third responsive means to prevent delivery of a pin from the conveyor to any of said pockets, preselectively manually controllable switches corresponding respectively with the plurality of pin receiving pockets and in circuit with said first and third electrical means, a preselectively manually controllable switch corresponding to said other pin receiving pocket and in circuit with said second and third electrical means, and switch means operating in timed relation with turret indexing for completion of a circuit to the appropriate electrical means through any selected manual switch.

8. A bowling pin handling apparatus as defined in claim 4, including, a selectively operable switch in said circuit controlling energization thereof, and solenoid means in said circuit energizable on energization of the circuit and adapted for connection with a pinsetter control to place the pinsetter in a second ball mode of operation on energization of the circuit.

9. A bowling pin handling apparatus as defined in claim 4, including, a selectively operable switch in said circuit controlling energization thereof, and relay means in said circuit energizable on energization of the circuit and adapted for connection with a pinsetter control to cycle the pinsetter on energization of the circuit.

10. A bowling pin handling apparatus as defined in claim 9, including, switch means in circuit with the relay means and adapted for actuation by a pinsetter control to de-energize the relay means on pinsetter cycling.

11. A bowling pin handling apparatus as defined in claim 6, including, a selectively conditionable frequent change override control in said circuit including switch means operable in response to completion of indexing of the turret to starting position for energizing the override control thereby to de-energize the first electrical means to prevent turret indexing and energize the second electrical means to prevent pin delivery to the turret.

12. A bowling pin handling apparatus as defined in claim 11, including, switch means in circuit with the override control and adapted for operation by a pinsetter control to de-energize the override control at a predetermined time in the pinsetter cycle.

13. A bowling pin handling apparatus as defined in claim 12, including, switch means in parallel with the last recited switch means and adapted for operation by a pinsetter control in response to a loaded pinsetter deck to maintain the override control energized until the deck is unloaded.

14. A bowling pin handling apparatus, comprising, a turret indexable about an upright axis and having a plurality of pin receiving pockets arranged in predetermined positions relative to the axis to move successively past a pin receiving station, a conveyor having a discharge end disposed to deliver pins successively to the turret pockets at the pin receiving station, first means responsive to the passage of each pin from the conveyor to a pin receiving pocket at the pin receiving station for indexing the turret to advance the next pocket to the pin receiving station, second means normally operative to block the passage of pins on the conveyor and conditionable in response to turret indexing to permit the passage of a pin to the turret, selectively operable motor means connected for controlling the first and second means to index any selected pocket past the pin receiving station while preventing delivery of a pin from the conveyor to said selected pocket, and circuit means connected for controlling energization of said motor means including manually preselectively operable controls corresponding respectively to said pockets to designate the pocket to be denied a pin and means operating in timed relationship with turret indexing for energizing the motor means to cause the first and second means to index the pocket designated by said manually preselectively operable controls past the pin receiving station while preventing delivery of a pin thereto.

15. A bowling pin handling apparatus, comprising, a turret having a plurality of pin receiving pockets arranged in predetermined positions around an upright axis and one other pocket at the axis, means mounting the turret for indexing movement about the axis to successively move said plurality of pockets and then said other pocket past a pin receiving station, a conveyor having a discharge end disposed to deliver pins successively to the turret pockets at the pin receiving station, first control means responsive to the passage of a pin from said conveyor to each of said plurality of pockets at the pin receiving station for indexing the turret to advance the next pocket to the pin receiving station, second control means responsive to the passage of a pin from said conveyor to said other pocket at the pin receiving station for indexing the turret to advance the first of said plurality of pockets to the pin receiving station, third control means normally blocking the passage of pins on the conveyor and conditionable in response to turret indexing to permit the passage of a pin from the conveyor to the turret, selectively operable motor means for controlling the first and third control means to index any preselected pockets of said plurality of pockets past the pin receiving station while preventing delivery of pins from the conveyor to said preselected pockets, selectively operable motor means controlling the second and third control means to index said other pocket past the pin receiving station while preventing delivery of a pin thereto, and circuit means connected for controlling energization of both motor means including manually preselectively operable controls corresponding respectively to said pockets to designate the pockets to be denied a pin and means operating in timed relationship with turret indexing for energizing the appropriate motor means to cause said numbered means to index the pockets designated by said manually preselectively operable controls past the pin receiving station while preventing delivery of a pin thereto.

16. A bowling pin handling apparatus, comprising, a turret indexable about an upright axis and having a plurality of pin receiving pockets arranged in predetermined positions relative to the axis to move successively past a pin receiving station, conveyor means having a discharge end disposed to deliver pins successively to the turret pockets at the pin receiving station, means responsive to the passage of pins to the turret for operating the conveyor means and the turret automatically in timed relation to alternately deliver a pin from the conveyor means to a turret pocket at the pin receiving station and then index the turret to position the next pocket at the pin receiving station, thereby to fill all turret pockets, a selectively energizable circuit including motor means operable in timed relationship with turret indexing and connected for controlling said responsive means to index any selected pocket past the pin receiving station while preventing delivery of a pin from the conveyor to said selected pocket, and manually operable switches corresponding respectively with said pockets in circuit with said motor means, and selectively conditionable to designate the pockets at which the motor means is to be operated.

17. A bowling pin handling apparatus, comprising, a turret indexable about an upright axis and having a plurality of pin receiving pockets arranged in predetermined positions relative to the axis to move successively past a pin receiving station, conveyor means having a discharge end disposed to deliver pins successively to the turret pockets at the pin receiving station, control means responsive to the passage of pins to the turret for operating the conveyor means and the turret automatically in timed relation to alternately deliver a pin from the conveyor means to a turret pocket at the pin receiving station and then index the turret to position the next pocket at the pin receiving station, thereby to fill all turret pockets, selectively operable motor means connected for controlling the control means to automatically index any selected pocket past the pin receiving station while preventing delivery of a pin from the conveyor to said selected pocket, and circuitry connected for controlling operation of said motor means including manually preselectively operable switches corresponding respectively to said pockets to designate the pocket to be denied a pin and switch means operating in timed relationship with turret indexing for energizing the motor means to cause the control means to index the pocket designated by said manually preselectively operable switches past the pin receiving station while preventing delivery of a pin thereto.

18. A bowling pin handling apparatus, comprising, a turret having a plurality of pin receiving pockets arranged in predetermined positions around an upright axis and one other pocket at the axis, means mounting the turret for indexing movement about the axis to successively move said plurality of pockets and then said other pocket past a pin receiving station, a conveyor having a discharge end disposed to deliver pins successively to the turret pockets at the pin receiving station, first control means normally blocking the passage of pins on the conveyor and conditionable in response to turret indexing to permit the passage of a pin to the turret, second control means responsive to the passage of a pin from said conveyor to each of said plurality of pockets at the pin receiving station for indexing the turret to advance the next pocket to the pin receiving station, third control means responsive to the passage of a pin from said conveyor to said other pocket at the pin receiving station for indexing the turret to advance the first of said plurality of pockets to the pin receiving station, first selectively operable electrical means for controlling the first control means to prevent delivery of a pin from the conveyor to any turret pocket, second selectively operable electrical means for controlling the second control means to index any of said plurality of pockets past the pin receiving station without receiving a pin, third electrical means for controlling said third control means to index said other pocket past the pin receiving station without receiving a pin, and manually selectively controllable switch means for controlling energization of the first electrical means and at the same time either the second electrical means or the third electrical means to prevent delivery of a pin to a selected pocket and index said selected pocket past the receiving station.

19. A bowling pin handling apparatus, comprising, a turret having a plurality of pin receiving pockets arranged in predetermined positions around an upright axis and one other pocket at the axis, means mounting the turret for indexing movement about the axis to successively move said plurality of pockets and then said other pocket past a pin receiving station, a conveyor having a discharge end disposed to deliver pins successively to the turret pockets at the pin receiving station, first control means normally blocking the passage of pins on the conveyor and conditionable in response to turret indexing to permit the passage of a pin to the turret, second control means responsive to the passage of a pin from said conveyor to each of said plurality of pockets at the pin receiving station for indexing the turret to advance the next pocket to the pin receiving station, third control means responsive to the passage of a pin from said conveyor to said other pocket at the pin receiving station for indexing the turret to advance the first of said plurality of pockets to the pin receiving station, first selectively operable electrical means for controlling the first control means to prevent delivery of a pin from the conveyor to any turret pocket, second selectively operable electrical means for controlling the second control means to index any of said plurality of pockets past the pin receiving station without receiving a pin, third electrical means for controlling said third control means to index said other pocket past the pin receiving station without receiving a pin, and preselectively manually controllable switch means corresponding respectively with the pin receiving pockets and in circuit with the electrical means for controlling energization of the first electrical means and at the same time energization of either the second electrical means or the third electrical means to prevent delivery of a pin or pins to any selected pocket or pockets and index the selected pocket or pockets past the pin receiving station, and switch means corresponding respectively with the pin receiving pockets and operating in timed relationship with turret indexing for completing a circuit to the electrical means through any selected manual switch means.

References Cited in the file of this patent

UNITED STATES PATENTS

| | | |
|---|---|---|
| 2,736,554 | Fluke et al. | Feb. 28, 1956 |
| 2,967,708 | Huck et al. | Jan. 10, 1961 |